United States Patent
Lye et al.

(10) Patent No.: US 7,604,197 B2
(45) Date of Patent: Oct. 20, 2009

(54) TOW CABLE TERMINATION

(75) Inventors: David John Lye, Hemel Hempstead (GB); Mark Allen Tomlinson, Hemel Hempstead (GB); Anthony Caesari, Crawley (GB)

(73) Assignee: Selex Sensors and Airborne Systems Limited, Basildon (GB)

( * ) Notice: Subject to any disclaimer, the term of this patent is extended or adjusted under 35 U.S.C. 154(b) by 515 days.

(21) Appl. No.: 10/588,799

(22) PCT Filed: Mar. 3, 2006

(86) PCT No.: PCT/GB2006/020046

§ 371 (c)(1),
(2), (4) Date: Aug. 9, 2006

(87) PCT Pub. No.: WO2006/095206

PCT Pub. Date: Sep. 14, 2006

(65) Prior Publication Data

US 2009/0035054 A1 Feb. 5, 2009

(30) Foreign Application Priority Data

Mar. 9, 2005 (EP) .................................. 05251424
Mar. 9, 2005 (GB) .................................. 0504842.6

(51) Int. Cl.
*B64D 3/00* (2006.01)

(52) U.S. Cl. .................................... 244/1 TD; 114/253

(58) Field of Classification Search ............... 244/1 TD, 244/3, 158.2, 135 A; 114/253; 439/6, 8
See application file for complete search history.

(56) References Cited

U.S. PATENT DOCUMENTS

| 2,443,114 | A |   | 6/1948  | Notestein et al. |
|-----------|---|---|---------|------------------|
| 3,011,737 | A | * | 12/1961 | Morrow ............................. 244/3 |
| 3,128,463 | A |   | 4/1964  | Hopper |
| 3,167,103 | A | * | 1/1965  | Hawthorne et al. ........ 220/4.15 |
| 3,490,799 | A |   | 1/1970  | Shreeve |
| 3,541,964 | A |   | 11/1970 | Harbert |
| 4,036,543 | A | * | 7/1977  | Taketomi ......................... 439/8 |
| 4,195,798 | A |   | 4/1980  | Costantino et al. |
| 4,958,847 | A |   | 9/1990  | Williams |
| 5,024,548 | A |   | 6/1991  | Timmington |
| 5,384,751 | A |   | 1/1995  | Blier et al. |

FOREIGN PATENT DOCUMENTS

| FR | 2.103.253    | 4/1972  |
| GB | 572780       | 10/1945 |
| GB | 722474       | 1/1955  |
| WO | WO 92/05040  | 4/1992  |

\* cited by examiner

*Primary Examiner*—Michael R Mansen
*Assistant Examiner*—Michael Kreiner
(74) *Attorney, Agent, or Firm*—Crowell & Moring LLP

(57) ABSTRACT

A specialist tow cable termination for sustaining the tensile load when an object is towed at high speeds at the end of an cable behind an aircraft, the termination comprises a closed eye bolt attached to the cable and a U-bolt looped through the eye bolt attached to the object. The arrangement allows significant pivoting bending stresses to the tow cable.

17 Claims, 1 Drawing Sheet

Fig.
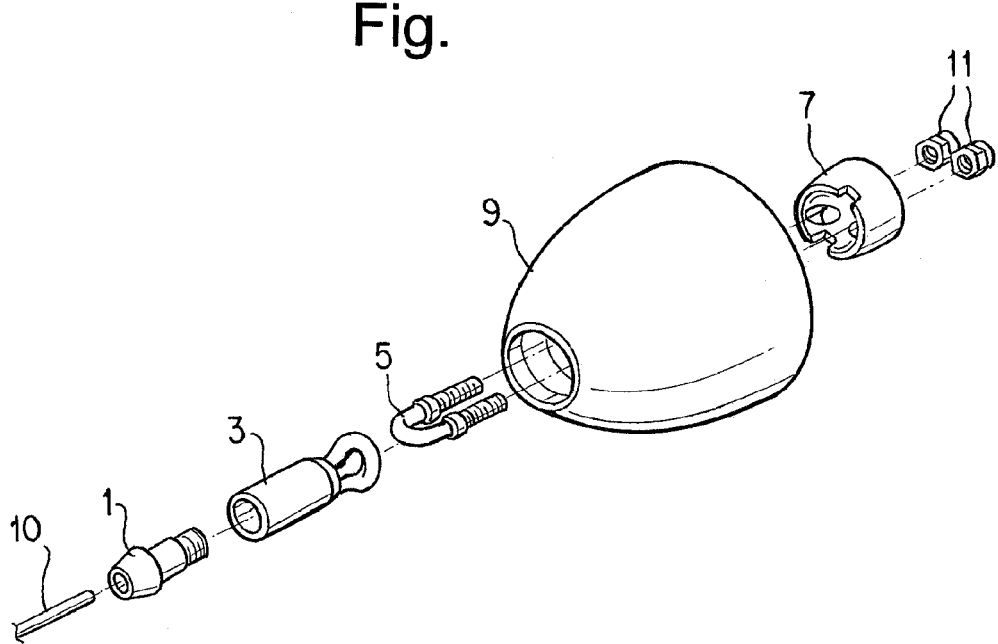

TOW CABLE TERMINATION

This invention relates to a tow cable termination for sustaining the tensile load when an object is towed at high speeds at the end of a cable, in particular to a termination used to connect a tow cable to an electronic warfare decoy used in fast jet applications for protection against missile attack.

BACKGROUND OF THE INVENTION

One technique used to protect jet aircraft against missile attack is an electronic decoy, which is towed behind the aircraft by a cable. Due to the high performance of these aircraft and the significant trailing vortices created by the aircraft wings, particularly during high "G" manoeuvres, the method by which the cable is terminated and connected to the decoy is fundamental to the successful operation of the towed decoy. The cable termination has to transmit those forces acting on the decoy in flight (aerodynamic drag and inertia) into tow cable.

The decoy's flight performance follows from its aerodynamic design, which to a large extent is determined by the relative positions of the centres of pressure and mass of the decoy. With a highly stable decoy, the decoy's centre of mass follows the tow cable, so that the cable termination transmits the loads from the decoy to the cable with little off-axis deviation. However, with a less stable decoy, or in a very high vortex environment or during high "G" manoeuvres, the axis of the decoy can fluctuate or deviate significantly with respect to the axis of the cable, typically up to a cone angle of plus or minus 90 degrees. In these circumstances, either the cable termination has to flex over this extremely wide angle of movement, or the tip of the tow cable itself has to flex over this range. Modern materials such as Kevlar (Kevlar is a trademark of EI Dupont de Nemours and company) have a very high strength to weight ratio and therefore are ideal for use as tow cables. However, even such modern materials cannot sustain local bending in a highly dynamic environment, and the rapid and persistent flexure of the cable near to the cable termination in a high vortex environment can lead to catastrophic failure. Specialist cable terminations have been proposed, but these generally have a limited angle of articulation, typically less than a cone angle of plus or minus 30 degrees. Techniques to relieve cable strain, to compensate for this low articulation, have been used, but these methods are insufficiently robust significantly to extend the life of the cable/cable termination arrangement. A low angle of articulation at the cable termination results in the tow cable flexing near the tip of the cable, resulting in the failure of the tow cable and the loss of the decoy. This mode of failure places a severe restriction on the flight envelope of the aircraft when towing a decoy.

SUMMARY OF THE INVENTION

Accordingly, the present invention provides a tow cable termination for sustaining the tensile load when an object is towed at high speeds at the end of a cable, the termination comprising a closed eye bolt attached to the cable and a U-bolt looped through the eye bolt and attached to the object.

Such an arrangement enables a high degree of articulation, up to a cone angle of plus or minus 90 degrees, whilst easily being capable of sustaining the normal tensile loads sustained when a fast jet aircraft is towing a decoy and of transmitting these loads into the tow cable without also transmitting any of the lateral forces which would cause the cable to flex.

Preferably the U-bolt is attached to the object so as to protrude from the object. This is an important factor in enabling the articulation; because the linkage is outside the envelope of the towed object (typically a decoy radome) the motion of the linkage is not restricted by the object itself impinging on the linkage.

The cable termination may comprise a cable barrel mounted to the end of the cable, the eye bolt being releasably attachable to the cable barrel. The cable barrel is the main interface to the tow cable. Within this component there may be features which enable the cable to be fixed by a conventional resin potting process so as to form a joint having a strength equivalent to that of the tow cable. Another desirable feature of the cable barrel is that it enables the optical and electrical conductors to be split out of the cable structure and routed to the decoy for connection to the electronics systems therein. In this case it is advantageous for the eye bolt to have an aperture for allowing at least part of the cable to extend through to connect to the object. Thus, the electronic and other systems in a decoy can be connected to the aircraft without the connection having to sustain any tensile loads caused by towing the decoy.

The cable barrel and the eye bolt are preferably provided with matching screw threads, so as to be releasably attachable. The aperture in the eye bolt allows optical and/or electrical conductors running down the core of the cable to connect through to the tow decoy. Due to the high dynamic motion and loads experienced on the eye bolt and the U-bolt where these are now looped together, one or both are preferably coated with a low friction material (such as by electroplating with a low friction coating) to enable the two elements to move freely as they articulate (pivot) in flight.

The U-bolt is preferably adapted to connect to an interface piece within the towed object so as to connect the U-bolt to the object and to permit pivotable motion therebetween. The design of the U-bolt and the interface piece is such as to minimise bending moments and fatigue stresses. The interface piece provides mechanical support to the U-bolt, by ensuring the structure is closed around the two arms of the U-bolt to the greatest extent possible whilst still maintaining the required kinematic motion. It is also important to maintain the minimum length of U-bolt commensurate with the degree of articulation required. Accordingly the U-bolt may be threaded at the ends and attached to the object by nuts threaded thereonto. This arrangement allows the length of U-bolt protruding from the object to be adjusted easily. Preferably the exterior of the interface and the interior of the object have matching sliding surfaces, such as spherical surfaces, to permit sliding therebetween, thus permitting a certain amount of pivotable motion whilst providing a firm mounting. Integral with the interface between the object and the interface piece may be environment seals to prevent the ingress of water and dust.

BRIEF DESCRIPTION OF THE DRAWINGS

The invention will now be described by way of example only and with reference to the accompanying FIGURE, which shows an exploded view of a tow cable termination assembly in accordance with the present invention.

DETAILED DESCRIPTION OF THE INVENTION

The assembly shown in the FIGURE comprises four main components for connection to the tow cable 10. The first component is the cable barrel 1 which is the main interface to the tow cable. The cable barrel 1 is in the form of a hollow cylinder which is connected to the cable by a convention resin potting process, forming a joint having a strength equivalent to that of the cable itself. Part of the exterior surface of the cable barrel 1 (the right hand portion as shown in the FIGURE) has a screw thread adapted to engage with a matching screw thread on the interior of eye bolt 3.

Eye bolt 3 is part of the articulation linkage; it is a high strength component and has an internal screw thread to accept the cable barrel 1. At one end (to the right as shown in the drawing) the eye bolt has a closed link (preferably circular) which mates with the U-bolt 5. Eye bolt 3 has an aperture (not shown) allowing optical and electrical conductors in the cable (not shown) to exit the eye bolt for connecting with the systems internally of the object to be towed.

The eye bolt 5 is secured to the object to be towed (illustrated here by radome 9) by interface piece 7 and nuts 11. The legs of U-bolt 5 are threaded for engagement with nuts 11, which hold interface piece 7 against the interior surface of radome 9. Interface piece 7 has spherical exterior surface adapted to engage with a matching surface on the inside of radome 9 so as to allow a certain amount of sliding movement so that the radome can pivot (although the main articulation takes place where the U-bolt 5 is looped through eye bolt 3).

In use, as the cable 10 and cable barrel 1 are towed through the air at fast jet speeds and the towed object 9 is buffeted and forced to oscillate by the trailing vortices from the towing aircraft, the towed object 9 pivots relative to the eye bolt 3 thus minimising the amount of stress applied to the tow cable itself.

Although described in connection with an object being towed through the air, the principles of the invention apply equally to objects being towed through water, for example to sonar decoys.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A tow cable termination for a towed decoy that is towed at high speeds at the end of a cable, the termination comprising a high articulation arrangement including a closed eye bolt attached to the cable and a U-bolt attached to the towed decoy and looped through the eye bolt, the eye bolt having an aperture receiving conductors in the cable and for allowing routing of the conductors through the articulation arrangement to systems within the towed decoy.

2. A termination as claimed in claim 1, wherein the U-bolt is attached to the towed decoy so as to protrude from the towed decoy.

3. A termination as claimed in claim 2, comprising a cable barrel mounted to the end of the cable, the eye bolt being releasably attachable to the cable barrel.

4. A termination as claimed in claim 3, comprising an interface piece adapted to connect the U-bolt to the towed decoy and to permit pivotal motion therebetween.

5. A termination as claimed in claim 4, wherein the exterior of the interface piece and the interior of the towed decoy have matching spherical sliding surfaces which permit sliding therebetween.

6. A termination as claimed in claim 5, comprising seals between the towed decoy and the interface piece for preventing water and/or dust ingress.

7. A termination as claimed in claim 6, wherein the U-bolt is threaded at the ends and attached to the towed decoy by nuts threaded there onto.

8. A termination as claimed in claim 7, wherein the eye bolt and/or the U-bolt is/are coated with a low friction material.

9. A termination as claimed in claim 1, comprising a cable barrel mounted to the end of the cable, the eye bolt being releasably attachable to the cable barrel.

10. A termination as claimed in claim 9, comprising an interface piece adapted to connect the U-bolt to the towed decoy and to permit pivotal motion therebetween.

11. A termination as claimed in claim 10, wherein the exterior of the interface piece and the interior of the towed decoy have matching spherical sliding surfaces which permit sliding therebetween.

12. A termination as claimed in claim 11, comprising seals between the towed decoy and the interface piece for preventing water and/or dust ingress.

13. A termination as claimed in claim 1, comprising an interface piece adapted to connect the U-bolt to the towed decoy and to permit pivotal motion therebetween.

14. A termination as claimed in claim 13, wherein the exterior of the interface piece and the interior of the towed decoy have matching spherical sliding surfaces which permit sliding therebetween.

15. A termination as claimed in claim 13, comprising seals between the towed decoy and the interface piece for preventing water and/or dust ingress.

16. A termination as claimed in claim 1, wherein the U-bolt is threaded at the ends and attached to the towed decoy by nuts threaded there onto.

17. A termination as claimed in claim 1, wherein the eye bolt and/or the U-bolt is/are coated with a low friction material.

\* \* \* \* \*

UNITED STATES PATENT AND TRADEMARK OFFICE
CERTIFICATE OF CORRECTION

PATENT NO.     : 7,604,197 B2                                     Page 1 of 1
APPLICATION NO. : 10/588799
DATED          : October 20, 2009
INVENTOR(S)    : Lye et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Fifth Day of October, 2010

David J. Kappos
*Director of the United States Patent and Trademark Office*